United States Patent [19]

Burdick et al.

[11] 4,436,850

[45] Mar. 13, 1984

[54] STABILIZING SBR LATEX IN CEMENT FORMULATIONS WITH LOW MOLECULAR WEIGHT POLYMERS

[75] Inventors: Patricia E. Burdick, Budd Lake; Ronald J. Rapp, Florham Park, both of N.J.

[73] Assignee: Allied Corporation, Morris Township, Morris County, N.J.

[21] Appl. No.: 312,480

[22] Filed: Oct. 19, 1981

[51] Int. Cl.³ .............................................. C08K 3/00
[52] U.S. Cl. ......................................................... 524/8
[58] Field of Search .......................................... 524/8

[56] References Cited

U.S. PATENT DOCUMENTS

| | | | |
|---|---|---|---|
| 3,042,643 | 7/1962 | Foster | 524/8 |
| 3,322,711 | 5/1967 | Bush et al. | 525/335 |
| 3,487,038 | 12/1969 | Toy et al. | 524/8 |
| 4,061,825 | 12/1977 | Counsell et al. | 524/8 |

*Primary Examiner*—Joseph L. Schofer
*Assistant Examiner*—N. Sarofim
*Attorney, Agent, or Firm*—Richard A. Negin; Patrick L. Henry

[57] ABSTRACT

A composition comprising cement, a synthetic latex, preferably SBR latex, water and a low molecular weight polymer. The low molecular polymer preferably has a thermogravimetric value of less than 25 percent weight loss at 350° C. The composition is useful in a method of making a cement composition containing an elastomeric latex.

16 Claims, No Drawings

STABILIZING SBR LATEX IN CEMENT FORMULATIONS WITH LOW MOLECULAR WEIGHT POLYMERS

DESCRIPTION

This invention relates to a composition comprising cement, latex containing an elastomer, water, and a low molecular weight polymer preferably having a thermogravimetric analysis value of less than 25 percent weight loss at 350° C.

For the purpose of the present invention the term cement will be confined to inorganic hydraulic cements such as Portland cement, aluminous cement, and related cements. The essential feature of these cements is their ability on hydration to form with water relatively insoluble bonded aggregations of considerable strength and dimensional stability. Cement compositions are known which contain a variety of additives. Included in these addivites are cement accelerators, cement retarders, light weight additives, heavy weight additives, and a variety of other materials.

Additionally, it is known to use carboxymethylhydroxyethyl cellulose, synthetic latex emulsions, organic polymers, and acrylic type copolymers as additives to cement composition. These latter additives have as their purpose to prevent premature dehydration of the composition, and to protect sensitive formations and obtain better "squeeze jobs" when used in oil well applications.

It is known that the addition of synthetic latex emulsions such as stryene butadiene rubber (SBR) latex emulsions improves impact strength, flexural strength and pressure resistance to the cement. It has been found that at higher temperatures the latex becomes unstable and its advantages are negated.

SUMMARY OF THE INVENTION

The present invention is a composition comprising cement, a latex containing an elastomer, preferably SBR latex, water, and a low molecular weight polymer preferably having a thermogravimetric value of less than 25 percent weight loss at 350° C. The low molecular weight polymer is preferably selected from the group consisting of a polyolefin, and an oxidized polyolefin. Preferred low molecular weight polymers include oxidized polyethylene, and polyethylene. There is from 0.1 to 10 times, preferably from 0.1 to 4 times, the weight of the elasomer contained in the latex, of the low molecular weight polymer.

DETAILED DESCRIPTION OF THE INVENTION

The present invention is a cement composition. The composition comprises cement, a latex containing an elastomer, water, and 0.1 to 10 times the weight of the elastomer in the latex of a low molecular weight polymer preferably having a thermogravimetic analysis value of less than 25 percent weight loss at 350° C.

Referring to the background, the term cement for the purpose of the present invention will be confined to inorganic hydraulic cements, such as Portland cement, aluminous cement and other related cements. The essential feature of these cements is their ability on hydration to form with water relatively insoluble bonded aggregations of considerable strength and dimensional stability. Cements useful in the composition of the present invention are disclosed in detail in V, Kirk-Othmer Encyclopedia of Chemical Technology Cement, pp. 163-193 (Third Edition), and Montgomery and Smith, The Petroleum Engineer, "Oil Well Cementing Practices and Materials" Parts 12A, 12B (May, June 1961). These two references are hereby incorporated by reference.

The cement composition of the present invention can contain cement additives listed in the cited references. The cement additives which can be included in the compositions of the present invention include but are not limited to: cement accelerators such as calcium chloride, sodium chloride, sodium silicate, gypsum cement; cement retarders such as calcium lignosulfonates, modified lignins, saturated salt water, carboxymethylhydroxyethyl cellulose; light weight additives to reduce slurry weight such as bentonite, pozzolans, gilsonite, expanded perlite, diatomaceous earth, and hydrocarbon emulsions; special cement additives such as gypsum cement, resin cement, diesel oil cement, pozzolan-lime cements; heavy weight additives to increase density and restrain pressure such as ilmenite, barite, sand, and satuated salt water; low water additives to protect sensitive formation, prevent premature dehydration and to assure better squeeze jobs in oil well applications such as carboxymethylhydroxyethyl cellulose, latex, acrylic type copolymers, and organic polymer blends; lost circulation additives to restore circulation, and increase fill up in oil well columns such as gilsonite, granulated nut hulls, cellophane flakes, expanded perlites, shredded fibers, bentonite, and bentonite diesel oil; and special additives such as radioactive tracers, activated charcoal column, paraformaldehyde-sodium chromate, and silica flour. These additives are explored in more detail in the Montgomery et al. article, sopra.

As noted in the Montgomery et al. article it is known to add synethetic latex to cement compositions. The purpose of adding synthetic latex emulsions is to lower fluid loss. Latex cement slurries have greater resiliency, good bonding qualities and high resistance to drilling fluids, acid and corrosive fluids in oil well applications. The addition of synthetic latex emulsions, preferably SBR latex emulsions improves the impact strength, pressure resistance, and flexural strength of the insoluble bonded aggregations formed upon addition of water. Water is added to the cement composition to cause a hydration reaction as noted in Helmuth et al. p. 169, supra.

For the purposes of the present invention the term latex will apply to emulsions of elastomeric type polymer materials and water using an emulsifying agent, with synthetic latex preferred. Common synthetic latexes which can be used with the present invention include but are not limited to styrene butadiene rubber (SBR), polyisoprene, polybutylene, chloroprene, nitrile rubber, polyacrylate latexes. The most preferred latex for use in cement compositions is SBR based latex. SBR based latexes useful in the present invention are described in Babbit, the Vanderbilt Rubber Handbook, pp. 51-77 (1978), hereby incorporated by reference. The relative amount of water in the latex emulsion, and free water added to the composition of the present invention depends on the total water content desired in the composition. Additionally, it has been found that water within the latex does not as readily participate in the hydration of the cement as does free water. Therefore, it is preferred to add some free water in addition to the water which is added with the synthetic latex to the cement.

The composition of the present invention is useful in making concrete. For the purposes of the present invention concrete is defined as a conglomerate of an aggregate in a cement matrix. The aggregate can include but is not limited to sand, gravel, pebbles, broker stone, blast-furnace slag, sea shell fragments, and the like.

The composition of the present invention contains from 0.1 to 10, and preferably 0.1 to 4 times the weight of the elastomer in the synthetic latex of the low molecular weight polymer. The low molecular weight polymer preferably has a thermogravimetric analysis value of less than 25 percent weight loss at 350° C. For the purpose of the present invention the themogravimetric analysis value is measured on the Thermogravimetric Analyzer, Model DuPont 951. The procedure and is to place a sample of about 39 mg on a platinum pan. The sample is heated in air at a rate of 10° C. per minute to a temperature of about 600° C. The weight of the sample is continually recorded. As will be shown in the examples and comparatives below, the properties of the cement compositions containing SBR latex deteriorate upon heating. However, using the low molecular weight polymer having a thermogravimetric analysis value of less than 25 weight percent loss at 350° C. results in an improvement in maintenance of physical properties of the composition. The composition of the present invention maintains its impact strength, flexural strength, and pressure resistance at elevated temperatures.

Oxidized polyethylene which has a thermogravimetric analysis value of less than 25 and preferably less than 15 percent weight loss at 350° C. is preferred.

The oxidized polyethylene useful in the present invention has a number average molecular weight of from 500 to 20,000 preferably 1000 to 8,000, and more preferably from 5,000 to 7,000, and an acid number from 10 to 40, and preferably from 15 to 30, milligrams of potassium hydroxide required to neutralize one gram of the oxidized polyethylene. For the purpose of the present invention molecular weights are number average molecular weights, as measured by a vapor phase osmometer. The procedure used is that disclosed in Kaufman and Falcetta, *INTRODUCTION TO POLYMER SCIENCE AND TECHNOLOGY; an S.P.E. Textbook.* pp. 173,174, Wiley Interscience Publication, 1977, hereby incorporated by reference. The specific gravity is from 0.915 about 0.99 and preferably from 0.97 to 0.99 (high density). The oxidized polyethylene can be prepared by methods known in the art. Oxidized polyolefins useful in the present invention and a typical method is the oxidation of polyethylene in the manner described in U.S. Pat. Nos. 3,322,711 and 3,129,667 which are hereby incorporated by reference.

Preferred oxidized polyethylenes are summarized in Table I.

TABLE I

| OPE | Softening Point ° C (ASTM-28) | Hardness dmm (ASTM D-5) | Density g/cc (ASTM D-1505) | Brookfield Viscosity @ 140° C. Centipoises | Acid No. mg KOH g OHDPE |
|---|---|---|---|---|---|
| A | 104 | 5.5 | 0.93 | 200 | 16 |
| B | 107 | 2.5 | 0.93 | 210 | 16 |
| C | 100 | 9.0 | 0.92 | 185 | 15 |
| D | 110 | 1.5 | 0.94 | 250 | 16 |
| E | 111 | 1.2 | 0.95 | 250 | 16 |
| F | 40 | 0.5 | 0.98 | 30,000[1] | 16 |
| G | 140 | — | — | —[2] | 7 |
| H | 138 | 0.5 | 0.99 | 9,000[1] | 28 |

[1] @ 149° C.
[2] Melt Index of 44, ASTM 1238 Condition C at 150° C., 2100 gm load.

The most preferred oxidized polyethylene (OPE) is oxidized high density polyethylene sample F of Table I (OPE-F), having a number average molecular weight from about 5,000 to 7,000.

Low molecular weight polymers having a thermogravimetric analysis value of greater than 25% at 350° C. can be used where the cement or concrete will not be used with continual exposure to elevated temperatures, such as in highways. Low molecular weight polymers which can be used in addition to oxidized polyolefins such as oxidized polyethylene, include low molecular weight polyolefins, such as low molecular weight polyethylene and low molecular weight polypropylene, with low molecular weight polyethylene being preferred. The low molecular weight polyethylene is used in cement compositions which are not used at temperatures above the melting point of the polyethylene for prolonged periods of time.

U.S. Pat. Nos. 3,332,926 and 3,345,352 disclose processes to produce low molecular weight polyolefins useful in the present invention. Preferred polyolefins are polyethylenes having a number average molecular weight of from 6,000 to 20,000, and preferably from 6,000 to 8,000. Low molecular weight polyethylenes which are particularly preferred include polyethylenes which are particularly preferred include those having an ASTM-28 softening point of from 110°–130° C., and ASTM D-5 hardness of less than 1 decimillimeter, an ASTM D-1505 density of 0.92.96 gm/cc, and a Brookfield viscosity at 140° C. of from 400–500 centipoise.

It is preferred to use a defoamer in the synthetic latex composition. This prevents foaming of the latex during mixing of the latex, and mixing of the latex into the composition of the present invention.

The low molecular weight polymer has to melt and flow to interact and stabilize the elastomer latex after the cement composition has set. In applications such as oil well linings the cement composition will be used at conditions where the set cement is at temperatures higher than the softening point of the low molecular weight polymer. The low molecular weight polymer will flow during use conditions. However, where the cement composition is used in applications at temperatures below the softening point of the low molecular weight polymer, it is necessary to heat the set concrete to a temperature above the softening point of the low molecular polymer, and preferably to from 10° C. to 100° C. above the softening point of the low molecular weight polymer to assure the low molecular weight polymer melts and flows to interact and stabilize the latex.

The set cement should be heated to a temperature above the softening point of the low molecular weight polymer for a sufficient time for the low molecular weight polymer to melt. The low molecular weight polymer can then flow through the capillaries and other openings in the set cement composition. The set cement composition is preferably heated to above the softening point for at least from 5 minutes to 2 hours.

Several examples are set forth below to illstrate the nature of the invention and the manner of carrying it out. However, the invention should not be considered as being limited to the details thereof.

EXAMPLES 1-4

Examples 1-4 and Comparative 1-2 illustrate the thermogravimetric values for several low molecular weight polymers. These polymers are classified by their ASTM E-28 softening point in °C., hardness according to ASTM D-5 in decimillimeters of needle penetration, ASTM D-1505 density in gm/cc, and Brookfield viscosity at 140° C. in centipoises. The acid number is in milligrams of potassium hydroxide necessary to neutralize one gram of ethylene acrylic acid. The number average molecular weight was measured by the procedure referenced above. Their properties are summarized in Table II.

TABLE II

| Sample | Softening Point | Hardness | Density | Viscosity | Acid No. | MWh |
|---|---|---|---|---|---|---|
| Comp. 1 PE-C-1 | 106 | 4.0 | .92 | 40 | — | <5500 |
| Comp. 2 EAA | 108 | 2.0 | .93 | 500 | 40 | — |
| Ex. 1 PE-Ex-1 | 117 | 0.5 | .94 | 450 | — | >7000 |

Comparative 1 (PE-C1) is low molecular weight polyethylene (PE), Comparative 2 is low molecular weight ethylene acrylic acid (EAA). Example 1 (PE-Ex-1) is a low molecular weight polyethylene having a number average molecular weight greater than 7000 (between 7000 and 7500), and Examples 2-4 are oxidized polyethylene as described in Table I as OPE samples, F, G, H respectively.

The thermogravimetric values of the low molecular weight polymers used as Comparatives 1 and 2 and in Examples 1-4 were measured as noted above. A thermogravimetric analyzer model DuPont 951 was used. 39 mg samples were placed on a platinum pan. The temperature was increased by 10° C./minute in air until about 600° C. The weight of the sample was continuously monitored. The results in percent weight loss at 275° C., 300° C., 325° C. and 350° C. are summarized in Table III.

TABLE III

| | Low M/W Polymer | % Weight Loss @ | | | |
|---|---|---|---|---|---|
| | | 275° C. | 300° C. | 325° C. | 350° C. |
| Comp. 1 | PE-C-1 | 1.7 | 7.0 | 23.0 | 72.0 |
| Comp. 2 | EAA | 2.0 | 6.5 | 21.0 | 50.5 |
| Ex. 1 | PE-Ex-1 | 1.7 | 7.5 | 32.0 | 76.0 |
| Ex. 2 | OPE-F | 1.4 | 4.0 | 7.5 | 10.8 |
| Ex. 3 | OPE-G | 0.3 | 5.0 | 10.5 | 14.8 |
| Ex. 4 | OPE-H | 1.0 | 3.0 | 7.0 | 9.8 |

The oxidized polyethylene values were all below 15 percent.

EXAMPLES 5-8

The compositions used to illustrate the present invention contained a base composition of 400 grams of sand, 133.2 grams of cement, 41.6 grams of SBR latex, 20 grams of water, and 1.3 grams of defoamer. The water to cement ratio was 0.32.

The sand used was ASTM Grade C-33 sand. The cement used was Portland Cement No. 1. The latex was THERMOFLEX TM SBR latex produced by the Reichhold Chemicals Comp. This latex is an nonionic emulsion having a pH of greater than 9.5. The latex contained 1 percent acrylic acid and sufficient water so that there is 47 percent solids. The defoamer was a 30 percent emulsion of dimethylpolysiloxane produced by the Stauffer-Wacker Chemical Corp. as SWS 213 silicon defoamer.

There were 6 grams of a low molecular weight polymer added in Comparatives 4 and 5, and Examples 5-8. Comparative 3 contains no low molecular weight polymer. The 6 grams is approximately 1 percent by weight based on the base composition, or approximately 32 percent be weight based on the SBR in the latex composition.

The composition was mixed in a laboratory cake dough type mixing device. The components were added in the following order: sand, cement, defoamer, latex, low molecular weight polymer, and water. The mixing was for 3 minutes at ambient conditions.

The composition was molded according to the procedure of ASTM C192. The composition was molded in 2.54 cm×2.54 cm×2.70 cm (1"×1"×5") molds for 24 hours at 23° C. (73° F.) and 70 percent relative humidity. The composition was removed from the mold after 24 hours and aged for 28 days at 23° C. (73° F.) and 70 percent relative humidity.

The modulus of rupture was tested according to ASTM C293-68. The modulus of rupture kilopascals (kPa) (pounds per square inch, psi) was measured for unheated samples and heated samples. The heated samples were heated by an infrared heat lamp 8.89 cm (3½ inches) from the sample. The samples were heated for about 45 minutes, or until the top surface temperature reached a maximum temperature of 230° C. and/or the bottom surface reached a maximum temperature of 180° C. The sample was than air cooled and tested with the load applied to the side which faced the infrared lamp (the 230° C. side).

Comparative 3 is the base composition containing no low molecular weight polymer. Comparatives 4 and 5 are base compositions containing low molecular weight polymers PE-C-1 and EAA described in Table II. Example 5 is the base composition containing PE-Ex-1 described in Table II. Example 6 is the base composition containing a low molecular weight polyethylene having a softening point of 116° C., a number average molecular weight of about 6000 to 6500, a hardness of 1.0, a density of 0.93 and a Brookfield viscosity fo 400 centipoise was tested used in Example 6. Examples 7 and 8 are base compositions containing OPE-A and OPE-F, described in Table I, respectively. The results are summarized in Table IV below.

TABLE IV

| | Low M/M Polymer | Modulus of Rupture KPa × 10³ (psi) | |
|---|---|---|---|
| | | Unheated | Heated |
| Comp. 3 | — | 14.8 (2150) | 9.5 (1380) |
| Comp. 4 | PE C-1 | 14.6 (2120) | 8.3 (1200) |
| Comp. 5 | EAA | 13.4 (1945) | 9.4 (1370) |
| Ex. 5 | PE Ex-1 | 12.9 (1870) | 11.0 (1590) |
| Ex. 6 | PE-Ex-6 | 13.8 (2000) | 11.0 (1600) |
| Ex. 7 | OPE A | 12.8 (1860) | 10.7 (1550) |
| Ex. 8 | OPE F | 14.5 (2100) | 11.6 (1680) |

EXAMPLES 9-14

Examples 9-14 are compositions of the present invention based on the base composition containing OPE-G and OPE H of Table I. The amounts of the oxidized polyethylene added are shown in grams. In Examples 9, 11 and 12 the 6 grams OPE corresponds to approximately 1 weight percent based on the base composition, or approximately 32 weight percent based on the SBR in the latex. In Example 10 the 12 grams of OPE corresponds to approximately 2 weight percent based on the base composition, or approximately 64 weight percent based on the SBR in the latex composition. In Example 13 the 24 grams of OPE corresponds to approximately 4 weight percent based on the base composition, or approximately 128 weight percent based on the SBR in the latex composition. Each sample was run against a comparative of the base composition containing no low molecular weight polymer. The samples were prepared and tested in accordance with the method described above with respect to Examples 5 through 8. The results are summarized in Table V below.

TABLE V

| Sample | | wt.grams | Modulus of Unheated | Rupture kPa × 10$^{-3}$ (psi) Heated |
|---|---|---|---|---|
| Comp. 6 | — | — | 13.9 (2010) | 8.8 (1280) |
| Ex. 9 | OPE-G | 6 | 12.8 (1850) | 8.5 (1240) |
| Comp. 7 | — | — | 12.6 (1830) | 8.4 (1220) |
| Ex. 10 | OPE-G | 12 | 11.7 (1700) | 8.5 (1240) |
| Comp. 8 | — | — | 8.8 (1280) | 6.6 (950) |
| Ex. 11 | OPE-F | 6 | 9.4 (1370) | 5.9 (860) |
| Comp. 9 | — | — | 14.2 (2060) | 9.5 (1380) |
| Ex. 12 | OPE-F | 6 | 14.5 (2100) | 11.6 (1680) |
| Comp. 10 | — | — | 14.0 (2030) | 11.0 (1600) |
| Ex. 13 | OPE-F | 24 | 12.2 (1770) | 10.5 (1530) |

A review of the results in Tables IV and V shows that Comparative compositions have a greater decrease in modulus of rupture upon heating than the example compositions. This is the case for the polyethylene homopolymer which has greater thermogravimetric values than the oxidized polyethylene. However, the lower thermogravimetric values of the oxidized polyethylene suggest that it will withstand higher temperatures for longer times.

While exemplary embodiments of the invention have been described, the true scope of the invention is to be determined from the following claims:

What is claimed is:

1. A composition comprising:
cement; latex containing an elastomer, water; and 0.1 to 10 times the weight of the elastomer of a low molecular weight polymer, selected from the group consisting of a polyethylene having a number average molecular weight of from 6,000 to 20,000 and an oxidized polyethylene having an acid number from 7 to 40.

2. The composition as recited in claim 1 wherein there is 1 to 4 times the weight of the elastomer of the low molecular weight polymer.

3. The composition as recited in claim 2 wherein the elastomer is styrene butadiene rubber.

4. The composition as recited in claim 3 wherein the low molecular weight polymer has a thermogravimetric analysis value of less than 25 percent weight loss at 350° C.

5. The composition as recited in claim 3 wherein the low molecular weight polymer have a thermogravimetric analysis value of less than 15 percent weight loss at 350° C.

6. The composition as recited in claim 4 wherein the polymer is oxidized polyethylene.

7. The composition as recited in claim 6 wherein the polymer has a molecular weight of 1,000 to 20,000.

8. The composition as recited in claim 6 wherein the polymer has a molecular weight of 2,000 to 8,000.

9. The composition as recited in claim 3 wherein the polymer is polyethylene having a weight average molecular weight of from 6,000 to 8,000.

10. The improved composition of the type as recited in claim 1 further comprising an aggregate selected from the group consisting of sand, gravel, pebbles, broken stone, blast-furnace slag and cinders.

11. A composition comprising: cement; latex containing an elastomer and water; and 0.1 to 10 times the weight of the elastomer of a low molecular weight polymer selected from the group consisting of a polyethylene having a number average molecular weight of from 6,000 to 20,000 and an oxidized polyethylene having an acid number from 7 to 40.

12. A method of making a cement composition comprising the steps of:
mixing a composition comprising cement, water, latex containing an elastomer, from 0.1 to 10 times the weight of the elastomer of a low molecular weight polymer selected from the group consisting of a polyethylene having a number average molecular weight of from 6,000 to 20,000 and an oxidized polyethylene having an acid number from 7 to 40;
allowing the cement composition to set; and
heating the set cement composition to above the softening point of the low molecular weight polymer for a sufficient time for the low molecular weight polymer to melt.

13. The method as recited in claim 12 wherein there is 0.1 to 4 times the weight of the elastomer of the low molecular weight polymer.

14. The method as recited in claim 12 wherein the elastomer is SBR.

15. The method as recited in claim 12 or 13 wherein the set cement is heated to from 10° C. to 100° C. above the softening point of the low molecular weight polymer.

16. The method as recited in claim 15 wherein the set cement is heated for from 15 minutes to 2 hours.

* * * * *